(12) United States Patent
Hayashi (10) Patent No.: US 11,840,942 B2
(45) Date of Patent: Dec. 12, 2023

(54) VARIABLE CAPACITY TURBOCHARGER

(71) Applicant: IHI Corporation, Tokyo (JP)

(72) Inventor: Katsunori Hayashi, Tokyo (JP)

(*) Notice: Subject to any disclaimer, the term of this patent is extended or adjusted under 35 U.S.C. 154(b) by 0 days.

(21) Appl. No.: 17/932,297

(22) Filed: Sep. 15, 2022

(65) Prior Publication Data

US 2023/0010238 A1 Jan. 12, 2023

Related U.S. Application Data

(63) Continuation of application No. PCT/JP2020/043982, filed on Nov. 26, 2020.

(30) Foreign Application Priority Data

Mar. 24, 2020 (JP) ................. 2020-052938

(51) Int. Cl.
| | |
|---|---|
| F01D 9/04 | (2006.01) |
| F01D 17/16 | (2006.01) |
| F01D 21/12 | (2006.01) |

(52) U.S. Cl.
CPC ............. *F01D 9/041* (2013.01); *F01D 9/045* (2013.01); *F01D 17/165* (2013.01); *F01D 21/12* (2013.01); *F05D 2220/40* (2013.01); *F05D 2240/128* (2013.01)

(58) Field of Classification Search
CPC ........ F01D 9/041; F01D 9/045; F01D 17/165; F01D 21/12; F05D 2220/40; F05D 2240/128; F02B 37/24; Y02T 10/12
See application file for complete search history.

(56) References Cited

U.S. PATENT DOCUMENTS

| | | |
|---|---|---|
| 2010/0008766 A1 | 1/2010 | Scholz et al. |
| 2017/0058764 A1 | 3/2017 | Bayod et al. |
| 2018/0179909 A1* | 6/2018 | Nishioka ............... F01D 17/165 |

(Continued)

FOREIGN PATENT DOCUMENTS

| | | |
|---|---|---|
| JP | 2009-243375 | 10/2009 |
| JP | 2009243300 A * | 10/2009 |
| JP | 2010-019252 | 1/2010 |

(Continued)

OTHER PUBLICATIONS

Translation JP-2010019252-A (Year: 2023).*

(Continued)

*Primary Examiner* — J. Todd Newton
(74) *Attorney, Agent, or Firm* — SOEI PATENT & LAW FIRM (57) ABSTRACT

A variable capacity turbocharger includes a nozzle flow path which allows a gas to pass from a scroll flow path toward a turbine impeller, a shroud side ring and a hub side ring which face each other in a rotation axis direction of the turbine impeller and form a nozzle flow path therebetween, a bearing hole which is provided in the shroud side ring, a bearing hole which is provided in the hub side ring, and a nozzle vane which is disposed in the nozzle flow path and is supported by both bearing holes. A center axis line of the bearing hole is located on the inside in a radial direction in relation to a center axis line of the bearing hole at a room temperature, and the center axis line is located on the outside in the radial direction in relation to the center axis line during operation.

20 Claims, 4 Drawing Sheets

(56) References Cited

U.S. PATENT DOCUMENTS

2019/0136756 A1   5/2019   Itou
2021/0010387 A1   1/2021   Hayashi et al.

FOREIGN PATENT DOCUMENTS

| JP | 2010019252 A | * | 1/2010 | ........... F01D 17/165 |
| JP | 2010-270638 | | 12/2010 | |
| JP | 2016-003565 | | 1/2016 | |
| WO | 2017/047356 | | 3/2017 | |
| WO | WO-2017047356 A1 | * | 3/2017 | ........... F01D 17/162 |
| WO | 2017/175615 | | 10/2017 | |
| WO | 2019/187474 | | 10/2019 | |

OTHER PUBLICATIONS

Translation WO-2017047356-A1 (Year: 2023).*
Translation JP-2009243300-A (Year: 2023).*
International Preliminary Report on Patentability with Written Opinion dated Oct. 6, 2022 for PCT/JP2020/043982.
International Search Report dated Feb. 9, 2021 for PCT/JP2020/043982.

* cited by examiner

VARIABLE CAPACITY TURBOCHARGER

CROSS-REFERENCE TO RELATED APPLICATIONS

This application is a continuation application of PCT Application No. PCT/JP2020/043982, filed Nov. 26, 2020, which claims the benefit of priority from Japanese Patent Application No. 2020-052938, filed on Mar. 24, 2020, the entire contents of which are incorporated herein by reference.

BACKGROUND

Variable capacity turbochargers described in Japanese Unexamined Patent Publication No. 2009-243375, Japanese Unexamined Patent Publication No. 2010-270638 and International Publication WO. 2017/047356 include a nozzle ring that is pivotally supported by two members, a nozzle support ring and a shroud.

SUMMARY

Disclosed herein is an example variable capacity turbocharger. The variable capacity turbocharger includes: a nozzle flow path which allows a gas to pass from a scroll flow path toward a turbine impeller; a first component and a second component which face each other in a rotation axis direction of the turbine impeller and form the nozzle flow path therebetween; a first bearing hole which is provided in the first component; a second bearing hole which is provided in the second component; and a nozzle vane which is disposed in the nozzle flow path and is supported by both the first bearing hole and the second bearing hole. A center axis line of the first bearing hole is located on the inside in a radial direction in relation to a center axis line of the second bearing hole at a room temperature. When a predetermined temperature difference is generated between the first component and the second component during operation, the center axis line of the first bearing hole is located on the outside in the radial direction in relation to the center axis line of the second bearing hole.

DETAILED DESCRIPTION

In the following description, with reference to the drawings, the same reference numbers are assigned to the same components or to similar components having the same function, and overlapping description is omitted.

In some turbochargers in which the nozzle ring is supported by two members located on either side of the nozzle ring, the position of a bearing hole may become displaced between the two members due to a difference in thermal expansion of the two members. As a result, a rotation shaft of a nozzle vane may become inclined and may not smoothly rotate. In contrast, example variable capacity turbochargers disclosed herein may be configured to realize a smooth rotation of the nozzle vane.

An example variable capacity turbocharger includes: a nozzle flow path which allows a gas to pass from a scroll flow path toward a turbine impeller; a first component and a second component which face each other in a rotation axis direction of the turbine impeller and form the nozzle flow path therebetween; a first bearing hole which is provided in the first component; a second bearing hole which is provided in the second component; and a nozzle vane which is disposed in the nozzle flow path and is supported by both the first bearing hole and the second bearing hole. A center axis line of the first bearing hole is located on the inside in a radial direction in relation to a center axis line of the second bearing hole at a room temperature. When a predetermined temperature difference is generated between the first component and the second component during operation, the center axis line of the first bearing hole is located on the outside in the radial direction in relation to the center axis line of the second bearing hole.

The predetermined temperature difference may be a maximum temperature difference which is generated in an operation condition as a temperature difference between the first component and the second component. Further, the radially inward displacement amount of the center axis line of the first bearing hole from the center axis line of the second bearing hole at the room temperature may be the same as the radially outward displacement amount of the center axis line of the first bearing hole from the center axis line of the second bearing hole during the operation. Further, the first component may be a shroud side ring and the second component may be a hub side ring.

Figure 1:
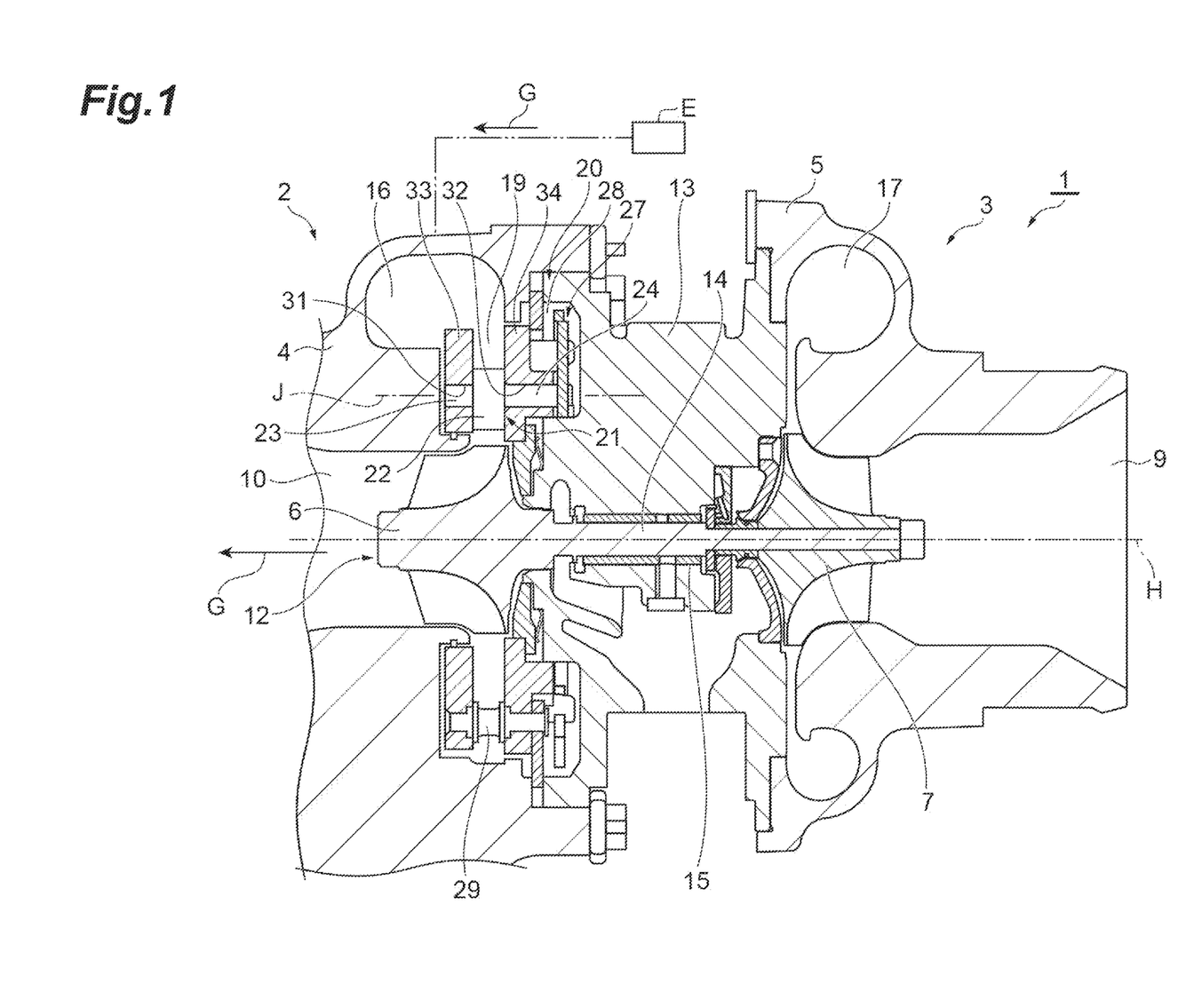
FIG. 1 is a cross-sectional view of an example turbocharger.

Hereinafter, an example variable capacity turbocharger will be described in detail with reference to the drawings. FIG. 1 is a cross-sectional view of a variable capacity turbocharger 1 including a rotation axis line H. The turbocharger 1 is applied to, for example, an internal combustion engine of a ship or a vehicle.

As shown in FIG. 1, the turbocharger 1 includes a turbine 2 and a compressor 3. The turbine 2 includes a turbine housing 4 and a turbine impeller 6 accommodated in the turbine housing 4. The turbine housing 4 includes a scroll flow path 16 which extends in the circumferential direction around the turbine impeller 6. The compressor 3 includes a compressor housing 5 and a compressor impeller 7 accommodated in the compressor housing 5. The compressor housing 5 includes a scroll flow path 17 which extends in the circumferential direction around the compressor impeller 7.

The turbine impeller 6 is provided at one end of a rotation shaft 14 and the compressor impeller 7 is provided at the other end of the rotation shaft 14. A bearing housing 13 is provided between the turbine housing 4 and the compressor housing 5. The rotation shaft 14 is rotatably supported by the bearing housing 13 through the bearing 15 and the rotation shaft 14, the turbine impeller 6, and the compressor impeller 7 rotate around the rotation axis line H as a single rotation body 12.

The turbine housing 4 is provided with an exhaust gas inlet and an exhaust gas outlet 10. An exhaust gas discharged from an internal combustion engine E flows into the turbine housing 4 through the exhaust gas inlet and flows into the turbine impeller 6 through the scroll flow path 16 to rotate the turbine impeller 6. Then, the exhaust gas G flows to the outside of the turbine housing 4 through the exhaust gas outlet 10.

The compressor housing 5 is provided with an intake port 9 and a discharge port. When the turbine impeller 6 rotates as described above, the compressor impeller 7 rotates through the rotation shaft 14. The rotating compressor impeller 7 sucks external air through the intake port 9. This air passes through the compressor impeller 7 and the scroll flow path 17 to be compressed and is discharged from the discharge port. The compressed air discharged from the discharge port is supplied to the above-described internal combustion engine E.

The turbine 2 of the turbocharger 1 will be further described. In the following description, the "axial direction", the "radial direction", and the "circumferential direction" respectively mean the rotation shaft direction (the direction of the rotation axis line H), the rotation radial direction, and the rotation circumferential direction of the turbine impeller 6.

In the turbine 2, a movable nozzle vane 21 is provided in a nozzle flow path 19 connecting the scroll flow path 16 and the turbine impeller 6. The plurality of nozzle vanes 21 are arranged at equal intervals on the circumference centered on the rotation axis line H. The nozzle vanes 21 rotate around a rotation axis line J substantially parallel to the rotation axis line H in a synchronized manner. When the plurality of nozzle vanes 21 rotate as described above, a gap between the adjacent nozzle vanes 21 expands and contracts so that the opening degree of the nozzle flow path 19 is adjusted.

In order to drive the nozzle vane 21 as described above, the turbine 2 includes a variable nozzle unit 20. The variable nozzle unit 20 is fitted into the turbine housing 4 and is fixed while being interposed between the turbine housing 4 and the bearing housing 13.

The variable nozzle unit 20 includes the plurality of nozzle vanes 21 and a shroud side ring 33 (e.g., a first component) and a hub side ring 34 (e.g., a second component) which face each other with the nozzle vane 21 interposed therebetween in the axial direction. The shroud side ring 33 (e.g., a first ring) and the hub side ring 34 (e.g., a second ring) are respectively formed in a ring shape centered on the rotation axis line H and are arranged to surround the turbine impeller 6 in the circumferential direction. A region interposed between the shroud side ring 33 and the hub side ring 34 in the axial direction constitutes the above-described nozzle flow path 19. The shroud side ring 33 and the hub side ring 34 are connected to each other by a plurality of connection pins 29 extending in the axial direction. Since the dimension of the connection pin 29 is made with accuracy, the dimensional accuracy of the nozzle flow path 19 in the axial direction is ensured.

The shroud side ring 33 is provided with the same number of columnar bearing holes 31 (e.g., first bearing holes) as the nozzle vanes 21. Similarly, the hub side ring 34 is also provided with bearing holes 32 (e.g., second bearing holes) having the same number as the nozzle vanes 21 and the same diameter as the bearing holes 31. The nozzle vane 21 includes a vane body 22 which rotates inside the nozzle flow path 19, a columnar vane rotation shaft 23 (e.g., a first vane shaft) which extends from the vane body 22 toward the shroud side ring 33, and a columnar vane rotation shaft 24 (e.g., a second vane shaft) which extends toward the hub side ring 34. The vane rotation shaft 23 and the vane rotation shaft 24 are formed in a columnar shape having the same outer diameter. The vane rotation shaft 23 is rotatably inserted into the bearing hole 31 and the vane rotation shaft 24 is rotatably inserted into the bearing hole 32. With this structure, the nozzle vane 21 is supported by both bearing holes 31 and 32.

Each vane rotation shaft 24 penetrates the hub side ring 34 and the end portion of each vane rotation shaft 24 is connected to a drive mechanism 27 on the rear surface side of the hub side ring 34. A mechanism space 28 is formed between the hub side ring 34 and the bearing housing 13 and the drive mechanism 27 is accommodated in the mechanism space 28. A drive force from an actuator is transmitted to each vane rotation shaft 24 through the drive mechanism 27. Due to the above-described drive force, the respective nozzle vanes 21 rotate around the rotation axis line J centered on the vane rotation shafts 23 and 24.

Figure 2:
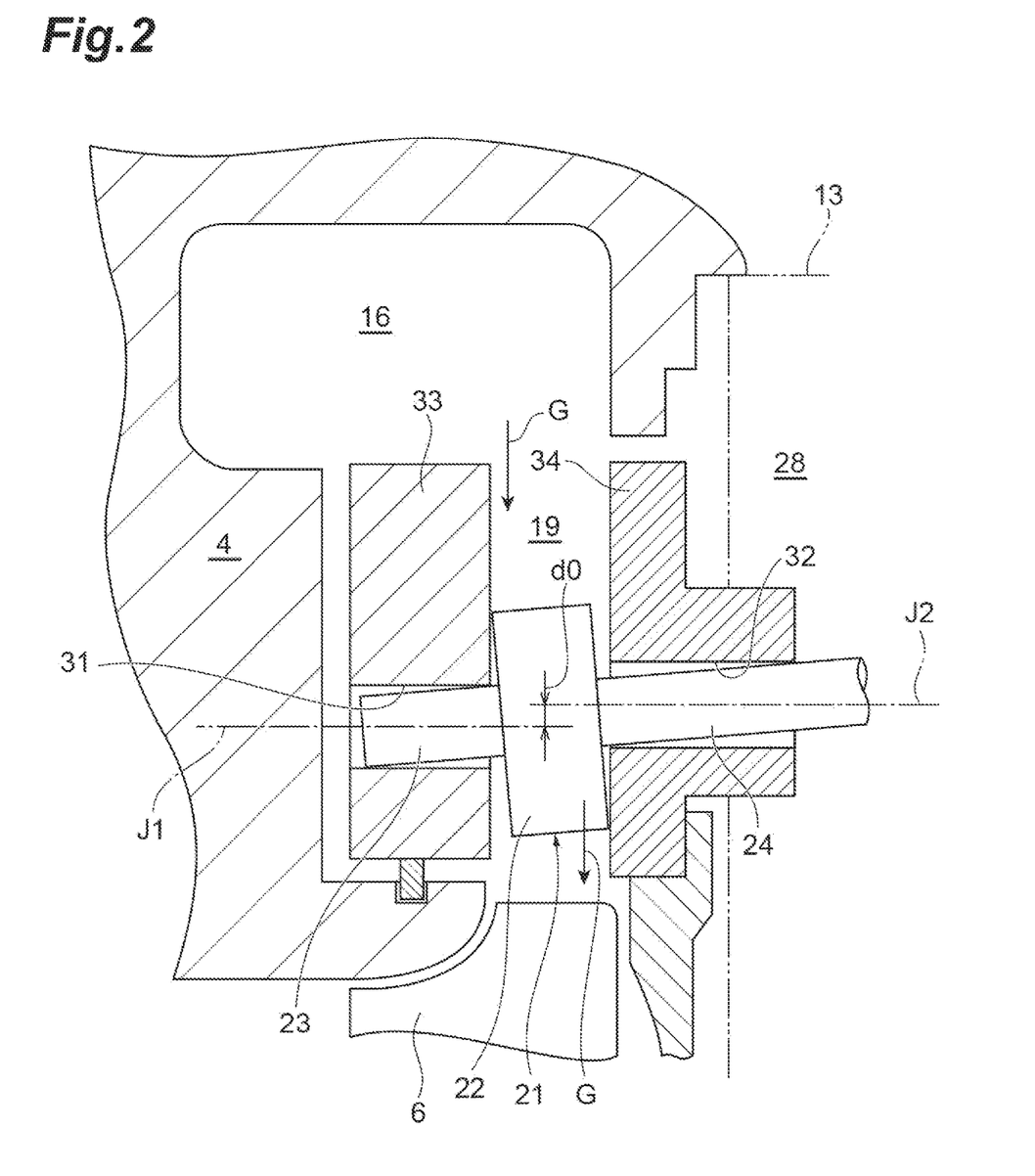
FIG. 2 is an enlarged cross-sectional view in the vicinity of a nozzle vane when a turbocharger is in a first state.
Figure 3:
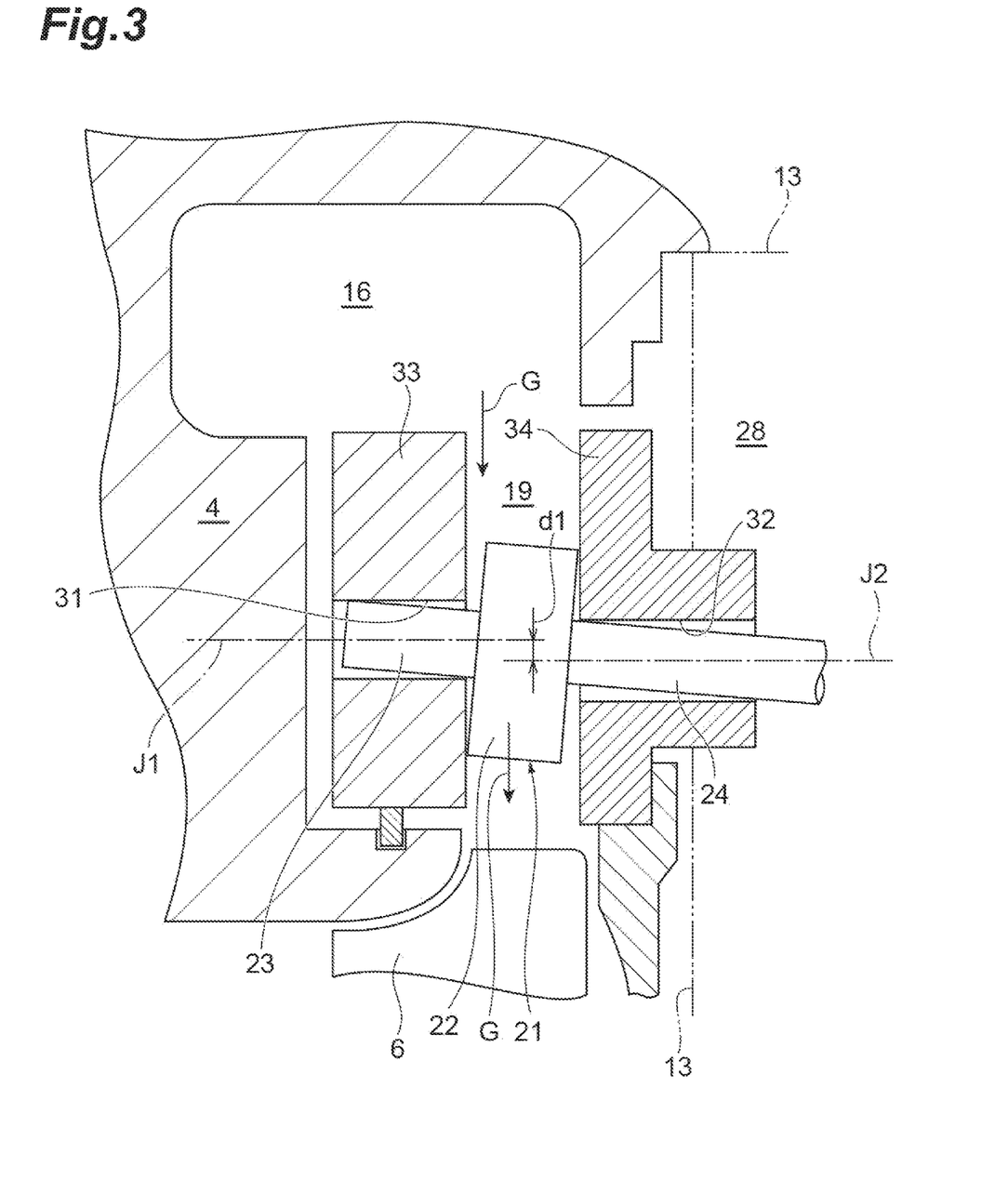
FIG. 3 is an enlarged cross-sectional view in the vicinity of the nozzle vane when the turbocharger is in a second state.

A structure in the vicinity of the nozzle vane 21 will be described with reference to FIGS. 2 and 3. FIG. 2 is an enlarged cross-sectional view in the vicinity of the nozzle vane 21 when the turbocharger 1 is in a "first state". FIG. 3 is an enlarged cross-sectional view in the vicinity of the nozzle vane 21 when the turbocharger 1 is in a "second state".

The "first state" is a state in which the turbocharger 1 is stopped (e.g., a non-operational state) and is at room temperature. In this state, the temperature of the shroud side ring 33 and the temperature of the hub side ring 34 are both room temperature. In this state, the temperature difference between the shroud ring 33 and the hub ring 34 is substantially zero (e.g., a first temperature difference). The above-described room temperature may be, for example, 20° C. or 25° C. or defined as a range of to 30° C. as the above-described room temperature. Additionally, the first state may be a state called a cold state of the turbocharger 1. For example, FIG. 2 shows the turbocharger 1 in a non-operational state. In FIG. 2, a center axis line J1 (e.g., a first center axis line) is located between the turbine impeller 6 and a center axis line J2 (e.g., a second center axis line) at the first temperature difference. In some examples, the first temperature difference may gradually increase to a non-zero value as the turbocharger begins to operate and the exhaust gas G flows into the nozzle flow path 19.

Figure 4A:
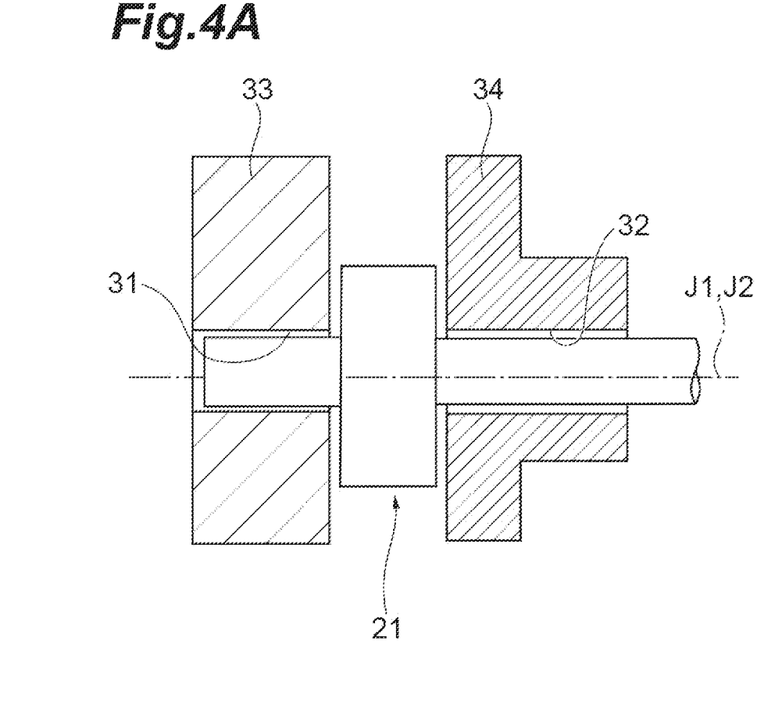
FIG. 4A is a cross-sectional view of an example turbocharger showing a state that a first center axis line and a second center axis line are colinear.

The "second state" is a state in which the variable nozzle unit 20 has a high temperature (for example, about 800 to 1000° C.) during the operation of the turbocharger 1 and a predetermined temperature difference is generated between the shroud side ring 33 and the hub side ring 34 as described below. In some examples, the temperature differences occurred by the high temperature may be referred to as a second temperature difference and/or a third temperature difference that is higher than the second temperature difference. In FIG. 4A, the center axis line J1 and the center axis line J2 are colinear at the second temperature difference during an operation condition of the turbocharger 1. In FIG. 3, the center axis line J2 is located between the turbine impeller 6 and the center axis line J1 at the third temperature difference. Here, the second state indicates a state when a maximum temperature difference which can be generated in the operation condition of the turbocharger 1 is generated between the shroud side ring 33 and the hub side ring 34. Additionally, the second state may be, for example, a state in which the exhaust gas G introduced from the internal combustion engine E into the turbine 2 has a maximum temperature which can be generated in the operation condition.

Additionally, FIGS. 2 and 3 are diagrams schematically showing the relative positions of the bearing holes 31 and 32 in an exaggerated state and do not show the actual deformation state of the shroud side ring 33 and the hub side ring 34 or the actual displacement of the bearing holes 31 and 32.

As shown in FIG. 2, when comparing a center axis line J1 (e.g., a first center axis line) of the bearing hole 31 and a center axis line J2 (e.g., a second center axis line) of the bearing hole 32 with each other in the first state, the center axis line J1 is located on the inside in the radial direction (on the side of the turbine impeller 6) in relation to the center axis line J2. As shown in FIG. 2, a displacement amount between the radial positions of the center axis line J1 and the center axis line J2 in the first state is indicated by d0. d0 is a positive value (d0>0). Hereinafter, the "displacement amount" means a displacement amount between the radial positions of the center axis line J1 and the center axis line J2.

When viewed from a line of sight parallel to the rotation axis line H (FIG. 1), the center axis line J1 and the center axis line J2 are both arranged on a virtual circumference centered on the rotation axis line H. Then, in the turbocharger 1 of the first state, the virtual circumference in which the center axis line J1 is arranged has a smaller diameter than that of the virtual circumference in which the center axis line J2 is arranged. The displacement amount d0 corresponds to a difference in radius between the virtual circumference in which the center axis line J1 is arranged and the virtual circumference in which the center axis line J2 is arranged. According to such a positional relationship between the bearing holes 31 and 32, as shown in FIG. 2, the nozzle vane 21 in the first state is inclined with respect to the rotation axis line H (FIG. 1).

Since a high-temperature gas passes through the turbine 2 during the operation of a turbocharger 1, the temperature of the variable nozzle unit 20 increases. Then, both center axis lines J1 and J2 are displaced outward in the radial direction due to the thermal expansion of the shroud side ring 33 and the hub side ring 34. Here, in this type of turbocharger 1 (FIG. 1), a cooling means of the bearing 15 exists in the bearing housing 13 in order to prevent the seizure of the bearing 15. Thus, there is a tendency that the shroud side ring 33 on the side farther from the bearing housing 13 tends to have a higher temperature than the hub side ring 34 on the side closer to the bearing housing 13 during operation. Then, a temperature difference is generated between the shroud side ring 33 and the hub side ring 34 and the center axis line J1 tends to largely move outward in the radial direction in relation to the center axis line J2 due to the thermal expansion difference therebetween. For example, the outward movement amount of the center axis line J1 in the radial direction due to the thermal expansion of the shroud side ring 33 is larger than the outward movement amount of the center axis line J2 in the radial direction due to the thermal expansion of the hub side ring 34 during the operation of the turbocharger 1.

With reference to the second state, as shown in FIG. 3, the center axis line J1 is located on the outside in the radial direction in relation to the center axis line J2. As shown in FIG. 3, a displacement amount between the radial positions of the center axis line J1 and the center axis line J2 in the second state is indicated by d1. d1 is a positive value (d1>0). In the turbocharger 1 of the second state, the virtual circumference in which the center axis line J1 is arranged has a larger diameter than the virtual circumference in which the center axis line J2 is arranged. The displacement amount d1 corresponds to a difference in radius between the virtual circumference in which the center axis line J1 is arranged and the virtual circumference in which the center axis line J2 is arranged. According to such a positional relationship between the bearing holes 31 and 32, as shown in FIG. 3, the nozzle vane 21 in the second state rotates with respect to the rotation axis line H (FIG. 1) while being inclined in a direction opposite to that of the case of the first state.

In some examples, the center axis line J1 is located on the inside in the radial direction in relation to the center axis line J2 in the first state and the center axis line J1 is located on the outside in the radial direction in relation to the center axis line J2 in the second state. Additionally, the center axis line J1 is displaced more radially outward than the center axis line J2 as the temperature of the exhaust gas E introduced into the turbine 2 increases. In anticipation of such a difference in displacement, the turbocharger 1 is designed and manufactured so that the center axis line J1 is previously located on the inside in the radial direction by d0 with respect to the center axis line J2 in the first state. As a result, the center axis line J1 is located on the outside in the radial direction by d1 with respect to the center axis line J2 in the second state of the turbocharger 1. In some examples, the axis line largely moving outward in the radial direction in accordance with an increase in the temperature of the variable nozzle unit 20 in the center axis line J1 and J2 is located on the inside in the radial direction in relation to the other axis line in the first state. Additionally, the relationship between the displacement amount d0 and the displacement amount d1 can be acquired in advance by the calculation or simulation based on the thermal expansion state between the shroud side ring 33 and the hub side ring 34 prior to the design of the turbocharger 1.

Additional operations and effects of the example turbocharger will be described in further detail. Before the turbocharger 1 is driven, the temperature of the turbocharger 1 substantially matches the room temperature (e.g., a first state). In the state, both of the shroud side ring 33 and the hub side ring 34 have substantially the same temperature. In the state, the temperature difference between the shroud side ring 33 and the hub ring 34 is an example of the first temperature difference. When the turbocharger 1 is driven, the high-temperature exhaust gas G discharged from the internal combustion engine E flows into the turbine housing 4, flows into the turbine impeller 6 through the scroll flow path 16 and the nozzle flow path 19, and rotates the turbine impeller 6. When the driving of the turbocharger 1 is started (operation condition), the temperature of the turbine housing 4 rises due to the high-temperature exhaust gas G. In the operation condition, the temperature difference between the shroud side ring 33 and the hub side ring 34 reaches the second temperature difference, and there is a possibility that the temperature difference reaches the third temperature difference.

For example, in the operation condition in which the center axis line J1 and the center axis line J2 are displaced in the radial direction, the nozzle vane 21 is inclined so that a gap between the vane rotation shafts 23 and 24 and the bearing holes 31 and 32 decreases. Then, since a gap between the vane body 22 and the wall surface of the nozzle flow path 19 also decreases, the nozzle vane 21 may not easily rotate and the operability of the variable nozzle unit 20 deteriorates. Then, the rotation of the nozzle vane 21 may become more difficult as the displacement amount between the center axis lines J1 and J2 becomes larger. Further, when the maximum displacement amount generated within the operation condition of the turbocharger exceeds a permissible limit, a rotation of the nozzle vane 21 may be inhibited during operation and the variable nozzle unit 20 may not function properly.

Figure 4B:
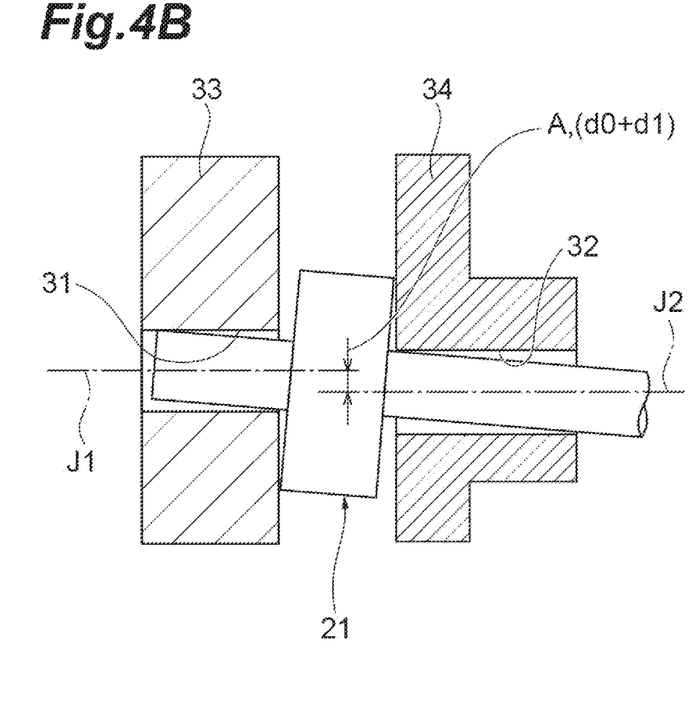
FIG. 4B is a cross-sectional view showing an example turbocharger in a state that a first center axis line and a second center axis line are offset from each other.

Here, it is assumed (for comparative example only) that the turbocharger is configured so that the center axis line J1 coincides with the center axis line J2 in a non-operational state. In this case, with reference to FIG. 4A, it is considered that the center axis line J1 is displaced outward in the radial direction with respect to the center axis line J2 and this displacement amount A becomes d0+d1 in the second state as shown in FIG. 4B. Thus, in this case, the maximum displacement amount which can be generated in the operation condition of the turbocharger becomes d0+d1.

On the other hand, the example turbocharger 1 may be configured such that the maximum displacement amount between the center axis lines J1 and J2 which can be generated in the operation condition is the larger one of the displacement amount d0 (FIG. 2) in the first state and the displacement amount d1 (FIG. 3) in the second state and is smaller than d0+d1 (FIG. 4B) in any case. Thus, the maximum displacement amount between the center axis lines J1 and J2 which can be generated during operation is reduced as compared with the related art shown in FIG. 4(a). As a result, the rotation of the nozzle vane 21 in the operation condition of the turbocharger 1 becomes smooth and the operability of the variable nozzle unit 20 is improved. The central axis line J2 is shown located between the turbine impeller 6 and the center axis line J1 at the high temperature difference (e.g., third temperature difference) in the operation condition. For example, the radially inward displacement amount of the center axis line J1 from the center axis line J2 at room temperature (e.g., first temperature difference) is the same as the radially outward displacement amount of the center axis line J1 from the center axis line J2 at the third temperature difference in the operation condition. Additionally, the radially outward displacement amount of the center axis line J1 from the center axis line J2 at the third temperature difference in the operation condition is smaller than the radially inward displacement amount of the center axis line J1 from the center axis line J2 at the first temperature.

In some examples, the maximum displacement amount becomes the smallest when the displacement amount d0 is the same as the displacement amount d1 (d0=d1). In the turbocharger configured such that the center axis line J1 and the center axis line J2 coincide with each other in the first state (FIG. 4(a)), the displacement amount A between the center axis lines J1 and J2 in the second state is acquired by the simulation and the turbocharger 1 may be designed and manufactured by adopting the half (A/2) of the displacement amount A as the displacement amount d0 (FIG. 2) in the first state. Then, the center axis line J1 and the center axis line J2 substantially coincide with each other when a temperature difference between the first state and the second state occurs between the shroud side ring 33 and the hub side ring 34. For example, the central axis line J1 and the central axis line J2 are colinear at a second temperature in the operation condition which is higher than the room temperature.

In a comparative example in which the permissible limit of the maximum displacement amount for rotating the nozzle vane 21 is smaller than the displacement amount A and is larger than the half (A/2) of the displacement amount A, the center axis line J1 coincides with the center axis line J2 in the first state (FIG. 4A), and the nozzle vane 21 cannot rotate during operation when the turbocharger reaches the second state. On the other hand, when the example turbocharger 1 is designed and manufactured by adopting the half (A/2) of the displacement amount A as the displacement amount d0 (FIG. 2) in the first state, the turbocharger 1 may prevent the nozzle vane 21 from becoming non-rotatable during operation.

Additionally, the permissible limit of the maximum displacement amount for rotating the nozzle vane 21 may depend on, for example, the clearance between the vane rotation shafts 23 and 24 and the bearing holes 31 and 32 or the clearance between the vane body 22 and the wall surface of the nozzle flow path 19. Further, this permissible limit may also depend on the operation condition of the turbocharger 1. Since the maximum displacement amount is the larger one of d0 and d1, the permissible limit may be slightly larger than the larger one of d0 and d1. Thus, the clearance between the vane rotation shafts 23 and 24 and the bearing holes 31 and 32 or the clearance between the vane body 22 and the wall surface of the nozzle flow path 19 can be set to be small as compared with the related art and, for example, a gas leaking from the gap between the nozzle flow path 19 and the vane body 22 can be reduced. Further, the operation condition of the turbocharger 1 may be widened (for example, by increasing the permissible temperature during the operation of the turbocharger 1) as compared with the related art.

It is to be understood that not all aspects, advantages and features described herein may necessarily be achieved by, or included in, any one particular example. Indeed, having described and illustrated various examples herein, it should be apparent that other examples may be modified in arrangement and detail.

For example, an example in which the displacement of the center axis lines J1 and J2 is caused by the temperature difference between the shroud side ring 33 and the hub side ring 34 has been described, but this displacement may be caused by another factor. As another factor, for example, a difference in material (linear expansion coefficient) between the shroud side ring 33 and the hub side ring 34 can be mentioned as an example.

Further, an example in which the outward movement of the center axis line J1 in the radial direction in accordance with an increase in the temperature of the variable nozzle unit 20 is larger than the movement of the center axis line J2 has been described. However, in contrast, the movement of the center axis line J2 may be larger than the movement of the center axis line J1. In this case, the center axis line J2 may be located on the inside in the radial direction in relation to the center axis line J1 in the first state and the center axis line J2 may be located on the outside in the radial direction in relation to the center axis line J1 in the second state.

In some examples, the axis line having a larger outward movement in the radial direction in accordance with an increase in the temperature of the variable nozzle unit 20 in the center axis lines J1 and J2 may be located on the inside in the radial direction in relation to the other axis line in the first state and the former axis line may be located on the outside in the radial direction in relation to the latter axis line in the second state.

The invention claimed is:
1. A variable capacity turbocharger comprising:
  a nozzle flow path which allows a gas to pass from a scroll flow path toward a turbine impeller;
  a first component and a second component which face each other in a rotation axis direction of the turbine impeller and form the nozzle flow path therebetween;
  a first bearing hole which is provided in the first component;
  a second bearing hole which is provided in the second component; and a nozzle vane which is disposed in the nozzle flow path and is supported by both the first bearing hole and the second bearing hole, wherein a first center axis line of the first bearing hole is located between the turbine impeller and a second center axis line of the second bearing hole at a first temperature difference between the first component and the second component, and wherein the first center axis line and the second center axis line are colinear at a second temperature difference between the first component and the second component during an operation condition of the variable capacity turbocharger, and wherein the second temperature difference is higher than the first temperature difference.

2. The variable capacity turbocharger according to claim 1, wherein the first temperature difference corresponds to a non-operational state of the variable capacity turbocharger at room temperature, and wherein the second temperature difference occurs during the operation condition of the variable capacity turbocharger in which the gas comprises an exhaust gas that flows into the nozzle flow path.

3. The variable capacity turbocharger according to claim 1, wherein a radially outward displacement amount of the first center axis line from the second center axis line in the operation condition is smaller than a radially inward displacement amount of the first center axis line from the second center axis line at the first temperature difference.

4. The variable capacity turbocharger according to claim 1, wherein the second center axis line is located between the turbine impeller and the first center axis line at a third temperature difference between the first component and the second component which is higher than the second temperature difference.

5. The variable capacity turbocharger according to claim 4, wherein a radially inward displacement amount of the first center axis line from the second center axis line at the first temperature difference is the same as a radially outward displacement amount of the first center axis line from the second center axis line at the third temperature difference.

6. The variable capacity turbocharger according to claim 4, wherein the third temperature difference between the first component and the second component is a maximum temperature difference which is generated in the operation condition.

7. The variable capacity turbocharger according to claim 6, further comprising a variable nozzle unit for driving the nozzle vane, wherein the maximum temperature difference is generated when the variable nozzle unit reaches 800° C. to 1000° C.

8. The variable capacity turbocharger according to claim 1, further comprising a turbine housing that houses the turbine impeller and a bearing housing that supports a rotation shaft of the turbine impeller, wherein the first component is a first ring located between the turbine housing and the nozzle flow path and the second component is a second ring located between the nozzle flow path and the bearing housing, and wherein a temperature in the first ring is higher than a temperature in the second ring in the operation condition.

9. A variable capacity turbocharger comprising:
a turbine impeller;
a first component and a second component which face each other in a rotation axis direction of the turbine impeller and form a nozzle flow path therebetween;
a first bearing hole which is provided in the first component;
a second bearing hole which is provided in the second component; and
a nozzle vane which is disposed in the nozzle flow path and is supported by both the first bearing hole and the second bearing hole,
wherein a first center axis line of the first bearing hole is located between the turbine impeller and a second center axis line of the second bearing hole when the variable capacity turbocharger is at room temperature.

10. The variable capacity turbocharger according to claim 9, wherein a vane shaft of the nozzle vane is inclined with respect to the first center axis line and the second center axis line at the room temperature.

11. The variable capacity turbocharger according to claim 9, further comprising a plurality of nozzle vanes with vane shafts,
wherein the vane shafts are inclined with respect to the first center axis line and the second center axis line at the room temperature.

12. The variable capacity turbocharger according to claim 9, further comprising a plurality of first bearing holes and a plurality of second bearing holes,
wherein the first bearing holes are arranged on a virtual circumference centered on a rotation axis line of the turbine impeller, the second bearing holes are arranged on a virtual circumference centered on the rotation axis line, and the virtual circumference on which the second bearing holes are arranged is larger than the virtual circumference on which the first bearing holes are arranged.

13. The variable capacity turbocharger according to claim 9, further comprising a turbine housing that houses the turbine impeller and a bearing housing that supports a rotation shaft of the turbine impeller,
wherein the first component is a first ring located between the turbine housing and the nozzle flow path, and the second component is a second ring located between the nozzle flow path and the bearing housing.

14. A variable capacity turbocharger comprising:
a first ring and a second ring which face each other in a rotation axis direction of a turbine impeller and form a nozzle flow path therebetween; and
a nozzle vane which is disposed in the nozzle flow path and comprises a vane shaft which is supported by both of a first bearing hole in the first ring and a second bearing hole in the second ring,
wherein the vane shaft is inclined with respect to a first center axis line of the first bearing hole and a second center axis line of the second bearing hole when the variable capacity turbocharger is at room temperature, and
wherein the first center axis line and the second center axis line are colinear during an operation condition of the variable capacity turbocharger which causes a temperature difference between the first ring and the second ring when an exhaust gas flows into the nozzle flow path.

15. The variable capacity turbocharger according to claim 14, further comprising a turbine housing that houses the turbine impeller and a bearing housing that supports a rotation shaft of the turbine impeller, wherein the first ring is located between the turbine housing and the nozzle flow path and the second ring is located between the nozzle flow path and the bearing housing.

16. The variable capacity turbocharger according to claim 14, wherein the first ring and the second ring are formed of materials having different linear expansion coefficients.

17. The variable capacity turbocharger according to claim 14, further comprising a variable nozzle unit for driving the nozzle vane,
   wherein the vane shaft is inclined with respect to the first center axis line and the second center axis line at a maximum temperature difference between the first ring and the second ring during the operation condition of the variable capacity turbocharger, and
   wherein the maximum temperature difference is generated when the variable nozzle unit reaches 800° C. to 1000° C.

18. The variable capacity turbocharger according to claim 14, wherein the operation condition comprises a rotational force that is applied to the turbine impeller as a result of the exhaust gas that flows into the nozzle flow path.

19. The variable capacity turbocharger according to claim 17, wherein the exhaust gas comprises a gas discharged from an internal combustion engine.

20. The variable capacity turbocharger according to claim 9, wherein the first center axis line and the second center axis line are colinear during an operation condition of the variable capacity turbocharger which causes a temperature difference between the first component and the second component when an exhaust gas flows into the nozzle flow path.

* * * * *